United States Patent Office 2,883,346
Patented Apr. 21, 1959

2,883,346

PREPARATION OF OXIDATION CATALYTIC UNITS

Wendal A. Alexander, Ottawa, Ontario, Canada, assignor to National Research Council, Ottawa, Ontario, Canada, a body corporate No Drawing. Application February 2, 1953
Serial No. 334,727

Claims priority, application Great Britain
February 28, 1952

9 Claims. (Cl. 252—473)

The present invention relates to a novel and improved silver catalyst unit for oxidation reactions, such as the oxidation of ethylene and to a method of preparing silver catalysts for use in such oxidation reactions.

Objects and advantages of the invention will be set forth in part hereinafter and in part will be obvious herefrom, or may be learned by practice with the invention, the same being realized and attained by means of the processes, steps, compositions and instrumentalities pointed out in the appended claims.

The invention consists in the novel processes, steps and improvements herein shown and described.

The present invention has for its object the provision of a novel and improved process for the production of oxidation catalysts which have an unusually long life, are highly effective, and can be economically produced for commercial use. The invention further provides catalytic members in which the active catalytic substance is durably supported on a member which has good or high heat conductivity and on which the catalytic substance is firmly bonded so that it has little tendency to loosen from its supporting layer, and at the same time has excellent heat transfer to the supporting layer, whereby the danger of explosion during the oxidation reaction is minimized. A further object of the invention is the provision of a novel and improved process by which the thickness of the layer of the catalytic substance may be accurately controlled and which provides relatively thick layers of long life and of good heat transfer properties. Still another object is the provision of a novel and improved catalytic unit which can be easily fabricated in sheet form and then worked to the desired shape before activation, and at a lower cost than heretofore possible with catalysts of silver-alkaline earth metal alloy. The invention further provides a silver-alkaline earth metal alloy for catalytic activation which is integrally bonded to a heat conductive metal base and has superior adherence on the metal base.

In many respects the present invention is an improvement of the oxidation catalyst disclosed in the prior United States patent to Adrien Cambron and Francis L. W. McKim, No. 2,562,858, granted July 31, 1951, but in other respects the present invention is of wider application.

As disclosed in said patent, the catalytic substance preferably comprises a silver-base alloy including from 1 to 75% of alkaline earth metal, such as calcium, the silver-base alloy being finely comminuted and treated to remove at least 5% of the alkaline earth metal from the silver-base alloy without significant removal of the silver. Such a catalyst may be used in its comminuted form or may be made into a paste which may be supported on a silver or other metallic support.

It has also been proposed to compact the comminuted paste of catalytic silver alloy after it has been applied to the metallic support so as to increase its adherence on the metallic support and to lengthen the useful life of the supported catalyst. However, in actual practice the comminuted material, even after compaction, tends to crack or peel away from the metallic support during fabrication, and the active catalyst layer does not have the same thermal transfer to the metallic support as can be achieved with the integral bonding of the layers in accordance with the process of the present invention. Consequently, the catalysts of the present invention can be operated at a more uniform temperature and are better adapted to carry away the heat of reaction, thereby minimizing the explosion hazard.

According to the present invention, the metallic supporting member is a clean sheet of silver or silver-plated or sheathed metal such as copper, aluminum, magnesium or stainless steel, having a thickness advantageously of at least 0.012 cm., and preferably at least about 0.025 cm. If desired, the metallic supporting member may comprise silver-clad base metal such as aluminum or copper, or aluminum coated with welded, electro-deposited or sprayed silver. Where the base metal is copper or a copper bearing alloy it is highly desirable that the silver layer should be sufficiently thick to be substantially impervious, thereby preventing the gas mixture from being in contact with the copper, which would impair the production of ethylene oxide.

Various treatments following the annealing step have also been found to be highly desirable in connection with the catalyst alloys used with the present invention, and certain compositions or crystaline structures of the catalyst alloys in the coating layer adherent on the base metal sheet have been found to resist removal of the alkaline earth metal in the activating treatment. Where this occurs due to the coherent nature of the surface layer, a simple rolling operation serves to open up the surface of the layer of the alloy coating so that it is thereafter activated by the treatment above referred to, and successive rolling operations can be performed if the rolls are roughened so as to prevent continued smoothing of the layer of catalytic alloy.

Also, it is sometimes found that the surface of the catalytic alloy coating may become oxidized or nitrided as the layer is cooled in air after the dipping operation or during the annealing operation, and the deleterious effect of the thin oxide or nitride layer is advantageously eliminated by abrading the surface of the catalytic alloy to remove the thin layer of the oxide or nitrided film. Such abrasive action may be carried out either by wire-brushing, sand-blasting, shot-blasting, or other abrading operations.

The minimum thickness of the silver-alkaline earth metal catalytic layer on the base metal is usually about 0.001" thick, and for practical purposes there is no maximum limit of thickness for the catalytic layer thickness, although in actual practice it is found that there is no practical advantage achieved by using layers thicker than 0.020" and prolonged catalytic activity is best achieved in most cases with a layer which is at least 0.005" thick.

The catalyst in the form of an alloy, may be mounted on one side of the base sheet metal or on both, dependent upon the manner in which the catalyst is to be used. To permit use of silver sheets which are very thin, a heat conducting core made of metal such as copper or aluminum may be arranged between the respective sheets of silver base prior to mounting of the alloy on the outer surface of the sheet metal base. The catalytic alloy on the surface of the metallic base comprises silver alloyed with from about 1% to about 75% of one or more alkaline earth metals, preferably calcium with small amounts of magnesium, and if desired traces of nickel may be added. These alkaline earth metals are melted and applied to the silver supporting member by dipping the metallic supporting member in the molten alkaline earth metal until the surface of the supporting member has been thoroughly wetted with the molten material, thereby producing an alloy layer firmly adherent on and firmly bonded with the metallic support integral with the main body of the metallic support.

In case the catalytic alloy is to be formed by dipping at temperatures in excess of about 550° C. the operations are preferably carried out in an inert atmosphere, such as helium or argon, but where the dipping is carried out at the lower temperatures, it may often be satisfactorily carried out in air without the protection of an inert atmosphere.

It is advantageous to dip the base metal sheet into a molten bath of two or more of the alkaline earth metals, preferably proportioned to form an eutectic alkaline earth metal alloy, which alloys wet the clean surface of the base metal sheet, and adhere thereto as a layer when the metal is removed from the molten bath, the thickness of the metal alloy layer depending on temperature, whether or not the surface of the sheet is wiped, and on how much of the metal alloy is drained off the metal sheet. Such dipping should be for only a short period, usually less than a minute, as longer times cause an excessive amount of the silver to dissolve into the molten bath. It is sufficient that the time be enough to thoroughly wet the silver surface.

After the desired thickness of catalyst has been formed on the surfaces of the metallic support, the catalyst unit is annealed, during which time the silver migrates into the alloy surface, and allowed to cool. The catalytic surface is then treated to activate the catalyst, such treatment generally being in accordance with the process of activation generally disclosed in the prior patent to Cambron and McKim, referred to above. According to this process the catalyst is treated with hot water (as liquid or vapor), acid or otherwise to remove a substantial portion of the alkaline earth metal from the exposed surface of the catalyst, at least 5% of the alkaline earth metal being generally removed from the alloy on the surface portion of the catalytic unit.

It will be understood that the foregoing general description and the following detailed description as well are exemplary and explanatory of the invention but are not restrictive thereof.

Referring now in more detail to the present preferred and illustrative manner in which the process of the present invention is put into practice, the silver surface of the sheet metal base is first cleaned so as to insure ready and complete wetting of the silver surface of the catalytic base member. The base is formed of metal of good heat conductivity and of sufficient thickness so that the base has good mechanical strength. The thickness of the metal base including its silver coatings, may vary from about 0.015 cm. up to any practical maximum thickness, but generally it is preferred to use a thickness of from about 0.025 to about 0.12 cm.

The alkaline earth metal alloy solution in which the silver surfaces are to be dipped comprises two or more of the alkaline earth metals. Such molten metal may contain a minor amount of nickel, although the inclusion of the nickel is not essential to the production of a commercially useful catalytic alloy for the oxidation of ethylene and other hydrocarbons. It is advantageous to dip the silver sheet into a molten bath of two or more of the alkaline earths, proportioned approximately to form a eutectic alkaline-earth alloy, which alloy soon wets the silver sufficiently to form a silver-alkaline earth metallic alloy layer on the silver base.

Thus, the molten bath in its broadest aspects comprises a molten mixture of two or more alkaline earth metals, such as calcium, strontium, barium and magnesium, to which may be advantageously added a minor amount of nickel. It is preferable that the molten alkaline earth metal bath should have a composition approximating that of a eutectic alloy of the component metals.

While the molten alloy bath is preferably a eutectic alloy of two or more of the alkaline earth metals, such as 21.5% magnesium and 78.5% calcium, any mixture of two or more alkaline earth metals may be employed, especially those in which a sufficient amount of the minor metal is included to lower the melting point so as to avoid excessive loss of silver from the base to the bath. This is achieved by using at least 1% of the minor alkaline earth metal constituent with one or more of the other alkaline earth metals forming the remainder of the alloy.

In its simplest form, the molten bath may originally comprise a mixture of two alkaline earth metals, preferably approximating 78.5% calcium and 21.5% magnesium, which, when molten, will wet and alloy with the silver on the surface of the metal sheet. The alloying of silver and alkaline earth metal is advantageously carried on further by annealing. This silver-alkaline earth metal alloy can be etched by treatment with water, acid or other material to remove some or most of the alkaline earth metal, as is necessary to activate the alloy and render it catalytic. A eutectic mixture of calcium and magnesium is advantageous in that it has a relatively low melting point (445° C.) and may be used, in many instances for alloying with silver, without a surrounding inert atmosphere.

Where additions of nickel are desired, satisfactory results are obtained with metallic nickel present in the molten metal bath from about 0.1% to about 3.0%.

After the base metal has been coated with the alloy layer from which the catalyst is to be formed, it is annealed at suitable temperatures for the required period of time, and the alloy layer adherent on the base metal is thereafter treated with hot liquid or vaporized water and then further treated to remove a substantial portion of the calcium or other alkaline earth metals so as to activate the silver-base alloy.

Where the base is of silver or silver-plated copper, the molten metal into which the silver is dipped may comprise two or more of the alkaline earth metals, preferably a eutectic alloy of calcium and magnesium which combines with and forms a silver-calcium-magnesium alloy on the metal base due to solution of the alkaline earth metal in the silver.

Examples of typical methods according to the present invention used in the preparation of catalytic units with the alloy adherently coated onto the surface of the base member by means of dipping the base member into a molten bath of an alkaline earth metal alloy appear below. It is to be understood that although a silver base member is illustratively used in the following examples, the base member may equally well be of silver-plated aluminum or silver plated copper, and that alloys of silver with two or more of the alkaline earth metals calcium, magnesium, strontium and barium may be used in place of the calcium-magnesium alloys referred to in the following examples.

Variations in composition of the metal or alloy dipping bath will cause changes in the melting point of the bath, and the melting point is preferably maintained relatively low to avoid unduly rapid solution of the silver of the base metal, while the temperature of the bath during dipping alloys the thickness of the coating to be accurately controlled, although the still molten layer of the alloy may be further regulated as to its thickness by speed of withdrawal, rate of cooling, by wiping or by hot-rolling of the coated base metal after dipping.

Annealing procedures of the alloy of controlled composition produce layers which consist of one or more phases. In the case of silver coated by Ca—Mg eutectic alloy, annealing at 475° C. for one-half hour produces a very brittle alloy layer which appears on etching and metallographic examination to be single phase. Where the coating metal or alloy is readily oxidizable a suitable inert atmosphere must be provided during annealing; in this case, argon may be used. Other factors in the annealing process which must be controlled are the usual ones of time and temperature.

The removal of the activating metals in the outer alloy layer may be effected successfully by steam treatment or other procedures set forth in the prior Patent No. 2,562,858 for silver catalyst materials, or it may be treated as follows:

The catalyst elements may be treated with a mixture of 90% nitrogen and 10% steam at a temperature of 350° C. for one hour and then with steam only, for three hours. The oxidized alloy may then be treated with 20% by volume of aqueous acetic or other acid for one and one-half hours and the solution decanted. The resulting catalytically activated alloy is washed in distilled water and dried.

The steam or hot water treatment of the alloy surface followed by the leaching or etching treatment with acid causes the surface of the silver-enriched surface to become porous, or sponge-like, due to the preferential removal of a substantial portion, and oftentimes all but a trace, of the alkaline earth metal leaving the silver substantially unaffected, while the under-surface portions of the alloy will, at least prior to use, contain a greater proportion of alkaline earth metal.

In the dip-coating procedure with calcium-base or other alkaline earth metal base coating alloys on silver sheet it is important to achieve a good adherence or wetting of the base metal by the coating liquid. An important point in the technique is to have a substantially oxide free surface on the dipping bath and a silver sheet thoroughly cleaned by degreasing and etching. The bath of e.g., Ca.Mg eutectic alloy is not sufficiently protected from oxidation and scum formation by an atmosphere of tank argon purified by passing over calcium turnings at 725° C. even with occasional stirring to remove the oxide film. Rapid stirring and immediate immersion of the silver sheet permits satisfactory wetting in most cases with such an argon atmosphere. Dip-coating can be done with a calcium-magnesium eutectic alloy in air by special care in removal of the oxide film from the melt.

*Example 1*

For use in a block reactor, thin silver sheets may be dipped in a Ca—Mg eutectic alloy bath (21.5% Mg, 78.5% Ca) in a closed iron vessel, with argon used as the atmosphere, the argon being purified by passing over calcium turnings at 725–730° C. The silver sheets, cleaned by degreasing and etching about 2 minutes in 35% nitric acid, are cut to small sheets and immersed 3 to 8 seconds in the bath at 475° to 505° C. The sheets are suspended above the melt during cooling so that annealing in argon takes place. The sheets may then be further cut to the desired sizes, activated by the standard steam treatment procedure of the Cambron and McKim patent and placed in an aluminum reactor block, at 260° C. through which the ethylene is passed over the catalyst at 2 litres per hour, with the air flow set at 30 litres per hour. Analyses of the gaseous products is as follows:

| Day No. | Percent $CO_2$ | Percent $C_2H_4O$ | Total Reaction | Yield (based on $C_2H_4O$) |
|---|---|---|---|---|
| 4 | 33.6 | 38.5 | 72.1 | 53.5 |
| 17 | 29.2 | 33.58 | 62.78 | 53.5 |
| 28 | 36.1 | 35.75 | 71.9 | 49.5 |
| 38 | 35.1 | 34.5 | 69.6 | 49.55 |

*Example 2*

A similar alloy bath to that described above may be used and the dip-coating may be done in the absence of any protective atmosphere. Sheet silver 0.1 cm. thick, cleaned as before, is degreased and etched with nitric acid. The temperature of the dipping alloy is maintained constant at 460° C. and the time of immersion may be 30 seconds for each sheet. Excess liquid alloy retained by surface tension on the sheet may be wiped off before solidification with steel wool wipers, so that only a thin liquid layer remains. The sheets are annealed at 475° C. for one-half hour in a purified argon atmosphere. The surface alloy layer is then broken up by rolling the samples to about 5% elongation between two sheets of 48 mesh stainless steel gauze to facilitate steam treatment. After steam treating by the standard method, tests for activity in the aluminum reactor block arrangement at 260° C., with flow rates for ethylene and air at 2 to 30 litres per hour, respectively, gave analyses of the off-gases as shown below:

| Day No. | Percent $CO_2$ | Percent $C_2H_4O$ | Total Reaction | Yield (based on $C_2H_4O$) |
|---|---|---|---|---|
| 2 | 25.7 | 35.49 | 61.19 | 58.0 |
| 9 | 22.4 | 30.3 | 52.7 | 57.5 |
| 15 | 19.79 | 24.49 | 44.19 | 55.25 |
| 20 | 21.5 | 24.7 | 46.2 | 53.5 |

*Example 3*

Sheets of silver clad aluminum, formed from sheet aluminum 0.010″ thick clad on each side with a sheet of silver 0.010″ thick, cleaned by immersion for several minutes in 40% nitric acid, are provided with a layer of a silver-calcium-magnesium alloy by immersion for about 30 seconds in a substantially eutectic calcium-magnesium alloy of about 80% calcium held at a temperature of about 460° C. After draining the excess eutectic alloy from the surface of the silver, with a relatively thick coating of the calcium-magnesium eutectic remaining on the silver surfaces, the alloy-coated silver surfaces are annealed for about an hour at a temperature of 475° C. Then the surface of the sheets may be rolled between coarse sheets of stainless steel screen to reduce the thickness of the coated sheets by about 5%, after which the surface is sand-blasted to remove the oxidized metal to prepare them for activation by treatment with steam for about 2½ hours at 350° C., after which the calcium is etched from the surface of the alloy by chemical means, as for instance, by treatment with acetic acid solution, as previously described.

When such activated sheets of the catalytic material were mounted for test so that 16 sq. in. of the catalyst were exposed, the following results were obtained when a mixture of 2 litres of ethylene and 30 litres of air was passed each hour over the catalyst:

| Day No. | Percent $CO_2$ | Percent $C_2H_4O$ | Total Reaction, Percent | Yield Percent (based on $C_2H_4O$) |
|---|---|---|---|---|
| 0 | 73 | 27 | 100 | 27 |
| 1 | 59.3 | 39.2 | 98.5 | 39.9 |
| 2 | 45.4 | 43.0 | 88.4 | 48.7 |
| 5 | 13.6 | 23.9 | 37.5 | 63.8 |
| 6 | 23.8 | 36.8 | 60.6 | 60.8 |

Instead of using silver clad aluminum, the silver surfaces may be used with a central sheet of copper, brass, magnesium or other structural metal.

*Example 4*

From 0.1% to 3.0% of nickel may be added to the catalytic alloy to decrease the conditioning time of the silver catalyst, and such additions of nickel are conveniently accomplished by adding a magnesium-nickel alloy to the dipping bath. The magnesium-nickel alloy is preferably a eutectic which contains about 23% nickel, melting at about 507° C. The effect of nickel is more pronounced when the annealing of the dipped silver sheet is carried out at a high temperature, for example 640° C. In other respects, the formation of the active alloy may be the same as in Example 3.

Example 5

Another catalytic unit may be prepared by a process generally like that of Example 3, except that the silver surfaces of the sheet material are coated with as thick a layer as conveniently possible of the magnesium-calcium eutectic alloy, after which the alloy is annealed by heating in argon for an hour at 585° C. Then, after reduction-rolling and sand-blasting, the alloy is steam treated in an autoclave at 200° C. for two hours, after which the calcium is removed by leaching with acetic acid in the usual way.

In actual tests, such a catalytic unit has given the following results when 2 litres of ethylene and 30 litres of air were passed over it per hour:

| Day No. | Percent $CO_2$ | Percent $C_2H_4O$ | Total Reaction, Percent | Yield Percent |
|---|---|---|---|---|
| 2 | 39.3 | 52.8 | 92.2 | 57.3 |
| 6 | 44.4 | 49.5 | 93.9 | 52.8 |
| 9 | 41.3 | 47.8 | 89.1 | 53.6 |
| 14 | 40.3 | 48.0 | 88.3 | 54.5 |
| 19 | 36.2 | 48.0 | 84.2 | 57.0 |

Example 6

Another catalytic unit prepared generally in accordance with the procedure of Example 3, and with a heavy layer of the calcium-magnesium eutectic alloy retained on the surface of the silver metal, was annealed by heating to 640° C. for one hour in an atmosphere of argon, then roughened and extended 15% by rolling with a coarse knurling tool, after which they were steam treated and leached with dilute acetic acid. Such a catalytic unit gave results as follows with ethylene and air flowing at the rates of 2 and 30 litres per hour.

| Day No. | Percent $CO_2$ | Percent $C_2H_4O$ | Total Reaction Percent | Yield Percent |
|---|---|---|---|---|
| 3 | 76.4 | 22.1 | 98.5 | 22.4 |
| 11 | 61.1 | 38.4 | 99.5 | 38.6 |
| 19 | 48.1 | 46.4 | 94.5 | 49.1 |
| 25 | 42.2 | 51.8 | 94.0 | 55.0 |
| 34 | 36.6 | 46.5 | 83.1 | 56.0 |
| 52 | 31.8 | 44.3 | 76.1 | 58.2 |
| 62 | 33.0 | 46.0 | 79.0 | 58.0 |
| 73 | 25.8 | 40.4 | 66.2 | 61.0 |
| 89 | 39.6 | 44.5 | 84.1 | 52.9 |
| 108 | 42.3 | 39.5 | 81.8 | 48.3 |
| 122 | 31.4 | 42.9 | 74.3 | 57.8 |

In general it has been found that higher annealing temperatures produce a longer sustained activity of the catalyst and while the annealing may be carried out at temperatures as low as about 400° C. or as high as about 660° or advantageously from about 450° to about 650° C., the annealing is preferably accomplished at temperatures ranging from about 500° to 640° C. At higher temperatures, the annealing time is shorter than at lower temperatures. At temperatures above about 450° C., it is usually necessary to employ an inert atmosphere such as argon, helium, or other inert gases, in place of the oxygen-containing air.

While the process has been described extensively in connection with the dipping of base metals into an alkaline earth metal alloy while the alloy is molten, similar results can be obtained according to the present invention, by spraying the molten alkaline earth metal alloy onto a clean metal base, while the metal base and the alloy spray are protected by an inert atmosphere, the sprayed metal forming a somewhat porous adherent alloy layer on the metal base which can readily be activated by somewhat shorter steam and etching or other removal treatments than have been specified for the catalytic alloys which are applied to the base metal by the immersion method.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. The process of preparing a catalytic unit for the oxidation of hydrocarbons, such as ethylene, which comprises coating an extended silver surface with a molten alloy consisting essentially of a mixture of alkaline earth metals by momentarily immersing the silver surface in said molten alloy and chemically removing from at least 5 percent to all but a trace of the alkaline earth metal from the alloy coating on the silver surface.

2. A process as claimed in claim 1 in which the alloy coating is annealed prior to removal of a portion of the alkaline earth metal from the surface alloy.

3. A process as claimed in claim 1 in which the molten mixture comprises a mixture of calcium and magnesium metals in substantially eutectic proportions.

4. A process as claimed in claim 2 in which the annealing is carried out above 450° C. in an inert atmosphere.

5. A process as claimed in claim 3 in which the molten mixture includes from 0.1% to 3.0% nickel.

6. The process of preparing a catalytic unit for oxidation of hydrocarbons, such as ethylene, which comprises forming a silver-alkaline earth alloy layer as an integral coating on an extended member having a silver surface, treating the alloy layer with hot water, and dissolving out from at least 5 percent to all but a trace of the alkaline earth metal from the surface of the alloy to render the alloy catalytically active.

7. A process as claimed in claim 6 in which the alloy is a silver-alkaline earth alloy layer and is annealed prior to treatment with steam.

8. A process as claimed in claim 6 in which the alloy layer is a silver-calcium-magnesium alloy.

9. A process as claimed in claim 7 in which the annealing is carried out in an inert atmosphere at from about 500° C. to 640° C.

References Cited in the file of this patent

UNITED STATES PATENTS 2,562,858  Cambron et al. _____ July 31, 1951

FOREIGN PATENTS 509,882  Belgium _____ Mar. 31, 1952

OTHER REFERENCES

Burns and Schuh's "Protection Coatings for Metals," New York, 1939, pages 37–39.